United States Patent
Joudon et al.

(10) Patent No.: US 12,091,156 B2
(45) Date of Patent: Sep. 17, 2024

(54) UNDUCTED FAN HAVING VARIABLE PITCH BLADES COMPRISING REDUCED DISTURBANCE PLATFORMS

(71) Applicant: SAFRAN AIRCRAFT ENGINES, Paris (FR)

(72) Inventors: Vincent Joudon, Moissy-Cramayel (FR); Vivien Mickaël Courtier, Moissy-Cramayel (FR); Clément Pierre Postec, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/022,385

(22) PCT Filed: Aug. 17, 2021

(86) PCT No.: PCT/FR2021/051471
§ 371 (c)(1),
(2) Date: Feb. 21, 2023

(87) PCT Pub. No.: WO2022/043631
PCT Pub. Date: Mar. 3, 2022

(65) Prior Publication Data
US 2023/0348042 A1    Nov. 2, 2023

(30) Foreign Application Priority Data
Aug. 27, 2020   (FR) ...................................... 2008755

(51) Int. Cl.
*B64C 11/26*   (2006.01)
*B29C 70/48*   (2006.01)
(Continued)

(52) U.S. Cl.
CPC .............. *B64C 11/26* (2013.01); *B29C 70/48* (2013.01); *B64C 11/06* (2013.01); *F03D 1/0675* (2013.01);
(Continued)

(58) Field of Classification Search
CPC .... F03D 1/0641; F03D 1/0647; F03D 1/0648; F03D 1/0658; F03D 1/066; F03D 1/069;
(Continued)

(56) References Cited

U.S. PATENT DOCUMENTS

| | | | |
|---|---|---|---|
| 4,045,149 A | 8/1977 | Ravenhall | |
| 5,190,441 A * | 3/1993 | Murphy | ................. F02K 3/072 |
| | | | 416/201 A |

(Continued)

FOREIGN PATENT DOCUMENTS

| | | |
|---|---|---|
| EP | 2796367 A1 | 10/2014 |
| FR | 2375033 A1 | 7/1978 |

(Continued)

OTHER PUBLICATIONS

International Search Report mailed Nov. 26, 2021, issued in corresponding International Application No. PCT/FR2021/051471, filed Aug. 17, 2021, 2 pages.

(Continued)

*Primary Examiner* — Binh Q Tran
(74) *Attorney, Agent, or Firm* — Christensen O'Connor Johnson Kindness PLLC

(57) ABSTRACT

An unducted fan having variable pitch blades for an aircraft or wind propulsion system is described. The fan includes a hub provided with housings pivotally receiving vanes about radial axes, and an outer casing of the hub into which circular openings of the housings open. Each vane includes a root which is rotatably mounted in the associated housing, a radially oriented blade and a disc-shaped platform extend- (Continued)

ing from the blade to an edge of the circular opening. The blade includes at least one skin which includes a free lower edge facing the side of the root, wherein the platform is attached to the free lower edge of the skin.

12 Claims, 18 Drawing Sheets

(51) Int. Cl.
*B29C 70/50* (2006.01)
*B64C 11/02* (2006.01)
*B64C 11/04* (2006.01)
*B64C 11/06* (2006.01)
*B64C 11/16* (2006.01)
*B64C 11/20* (2006.01)
*B64C 27/26* (2006.01)
*B64C 27/467* (2006.01)
*F03D 1/00* (2006.01)
*F03D 1/06* (2006.01)

(52) U.S. Cl.
CPC .............. *B29C 70/50* (2013.01); *B64C 11/02* (2013.01); *B64C 11/04* (2013.01); *B64C 11/16* (2013.01); *B64C 11/20* (2013.01); *B64C 27/26* (2013.01); *B64C 27/467* (2013.01); *F03D 1/0658* (2013.01); *F03D 1/101* (2023.08)

(58) Field of Classification Search
CPC ...... F03D 1/0675; F03D 1/0691; F03D 1/101; F03D 17/028
See application file for complete search history.

(56) References Cited

U.S. PATENT DOCUMENTS

| 6,213,719 | B1 | 4/2001 | Violette et al. | |
|---|---|---|---|---|
| 9,771,810 | B2 | 9/2017 | Marchal et al. | |
| 10,794,392 | B2 | 10/2020 | Foresto et al. | |
| 2010/0054913 | A1* | 3/2010 | Morel | B64C 21/04 415/68 |
| 2014/0314577 | A1* | 10/2014 | Udall | B64C 11/04 416/220 R |
| 2014/0341739 | A1* | 11/2014 | Tajan | F04D 29/366 416/147 |
| 2021/0108523 | A1* | 4/2021 | Miller | F02K 3/06 |
| 2021/0317799 | A1* | 10/2021 | Dubois | F02C 6/08 |
| 2023/0027670 | A1* | 1/2023 | Souryavongsa | B29C 70/48 |

FOREIGN PATENT DOCUMENTS

| FR | 3048228 A1 | 9/2017 |
|---|---|---|
| GB | 1567968 A | 5/1980 |
| WO | 2013/104852 A2 | 7/2013 |

OTHER PUBLICATIONS

Written Opinion of the International Searching Authority mailed Nov. 26, 2021, issued in corresponding International Application No. PCT/FR2021/051471, filed Aug. 17, 2021, 7 pages.

* cited by examiner

[Fig.1]
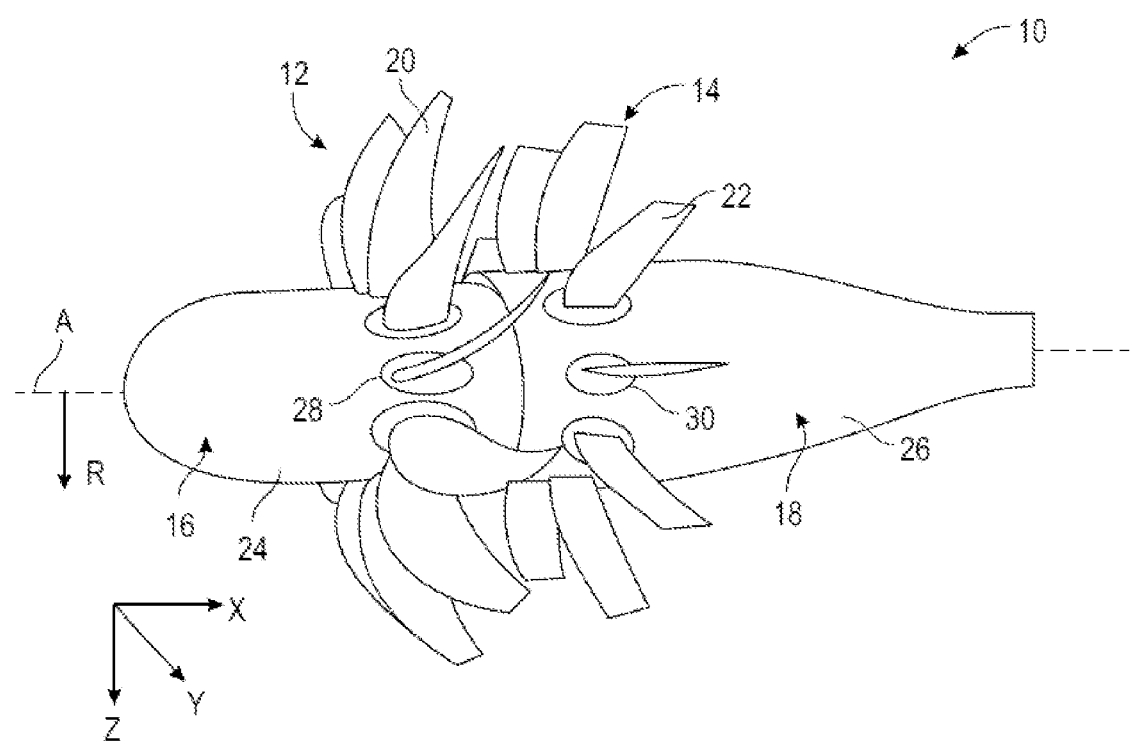

[Fig.2]
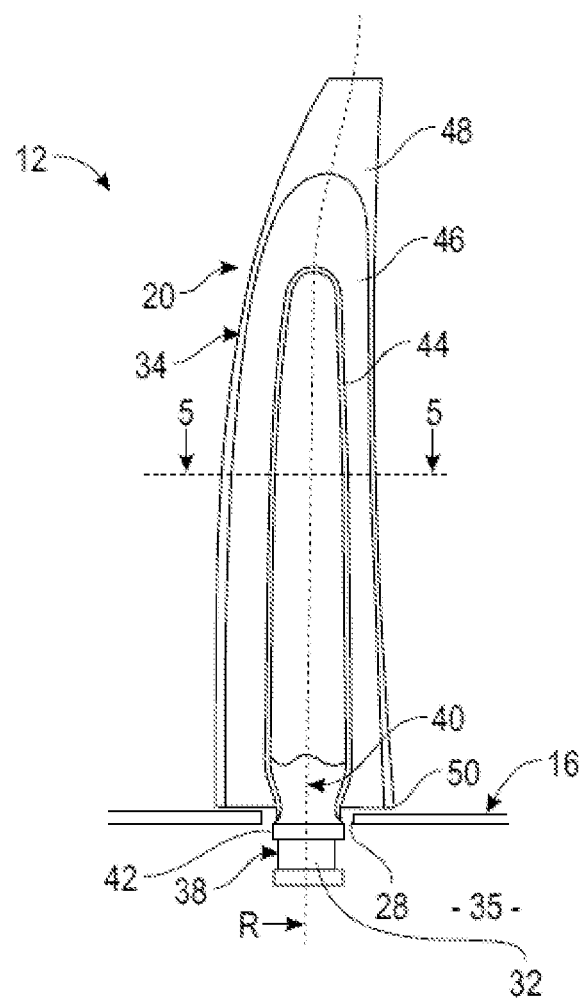

[Fig.3]
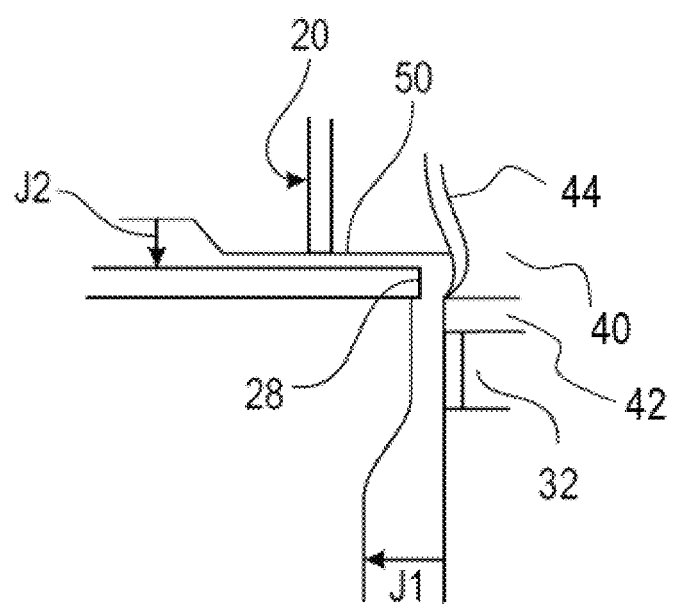

[Fig.4]
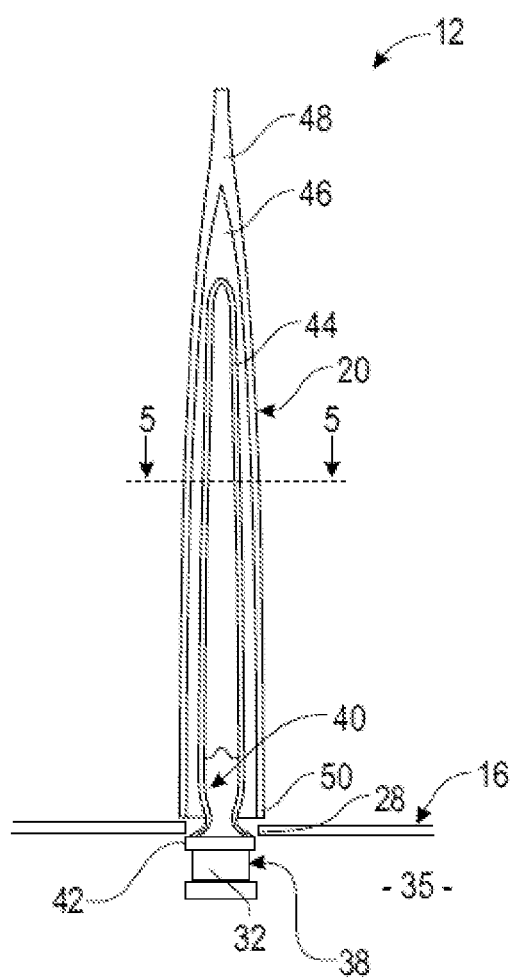

[Fig.5]
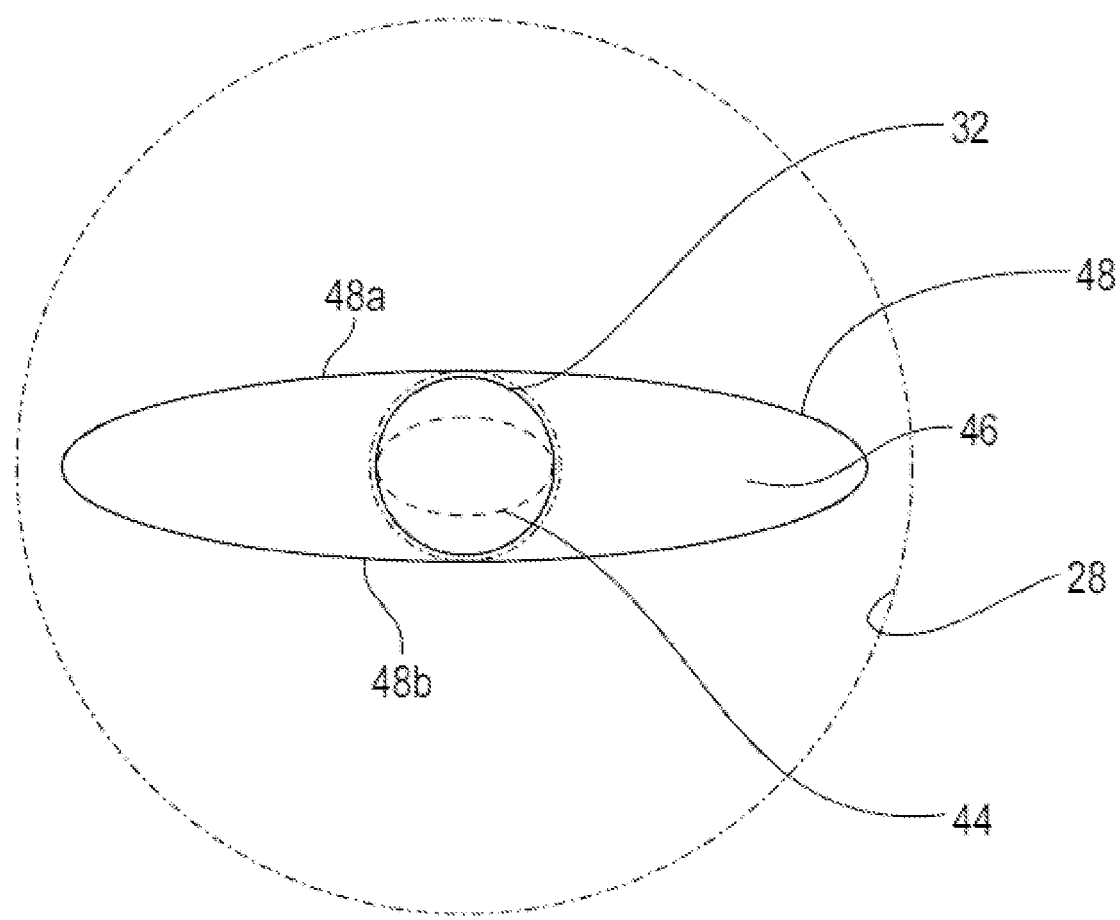

[Fig.6]
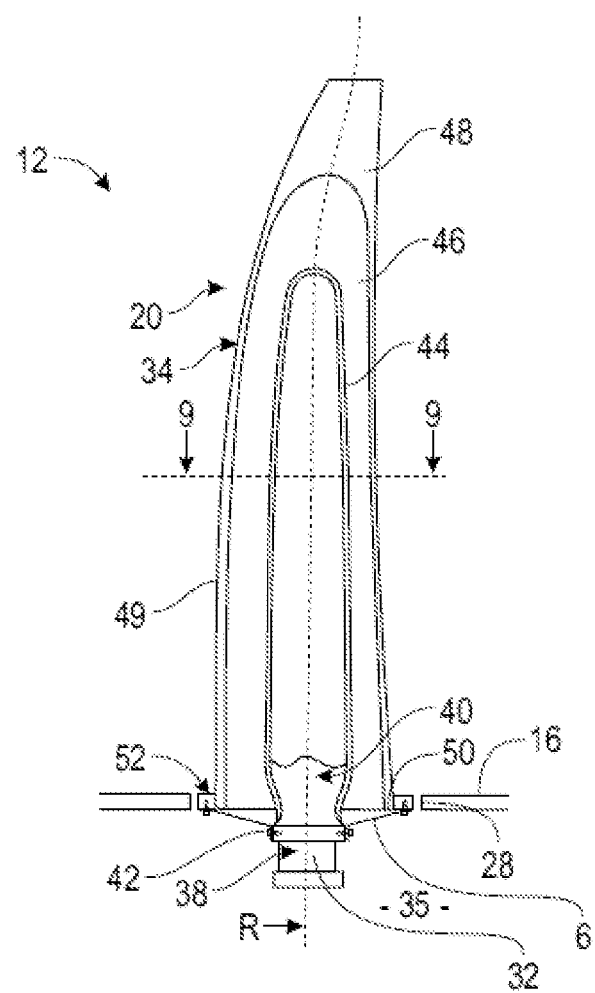

[Fig.7]
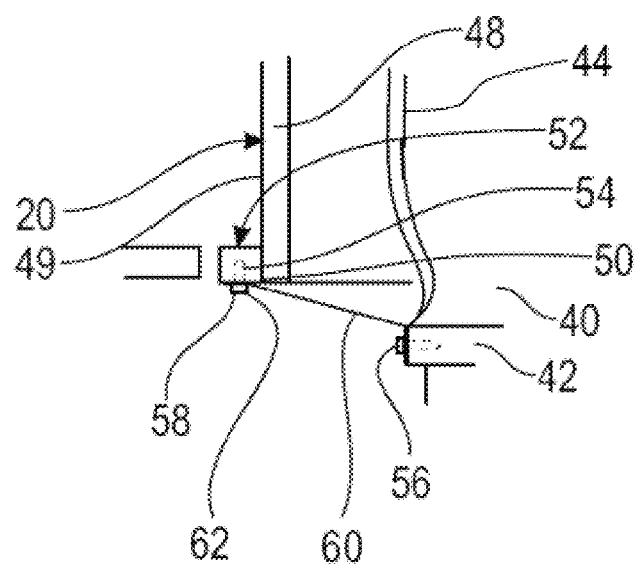

[Fig.8]
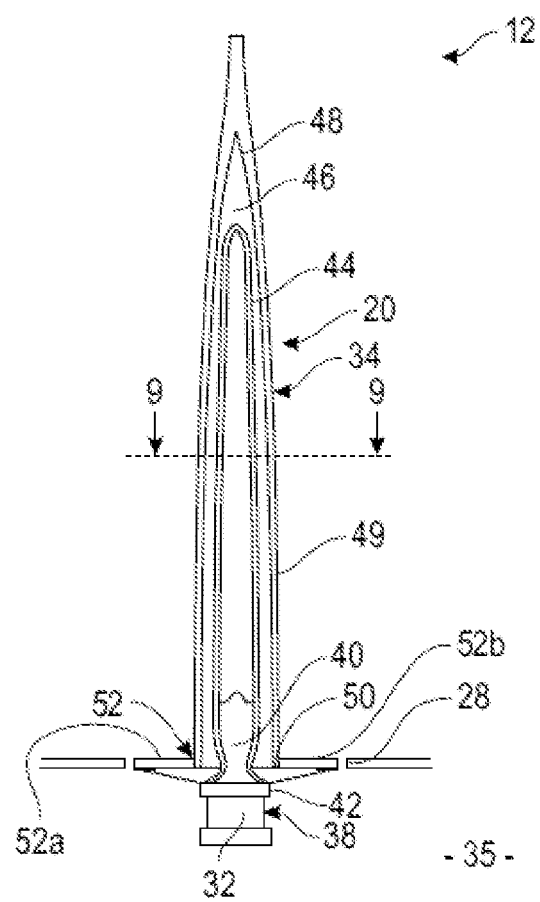

[Fig.9]
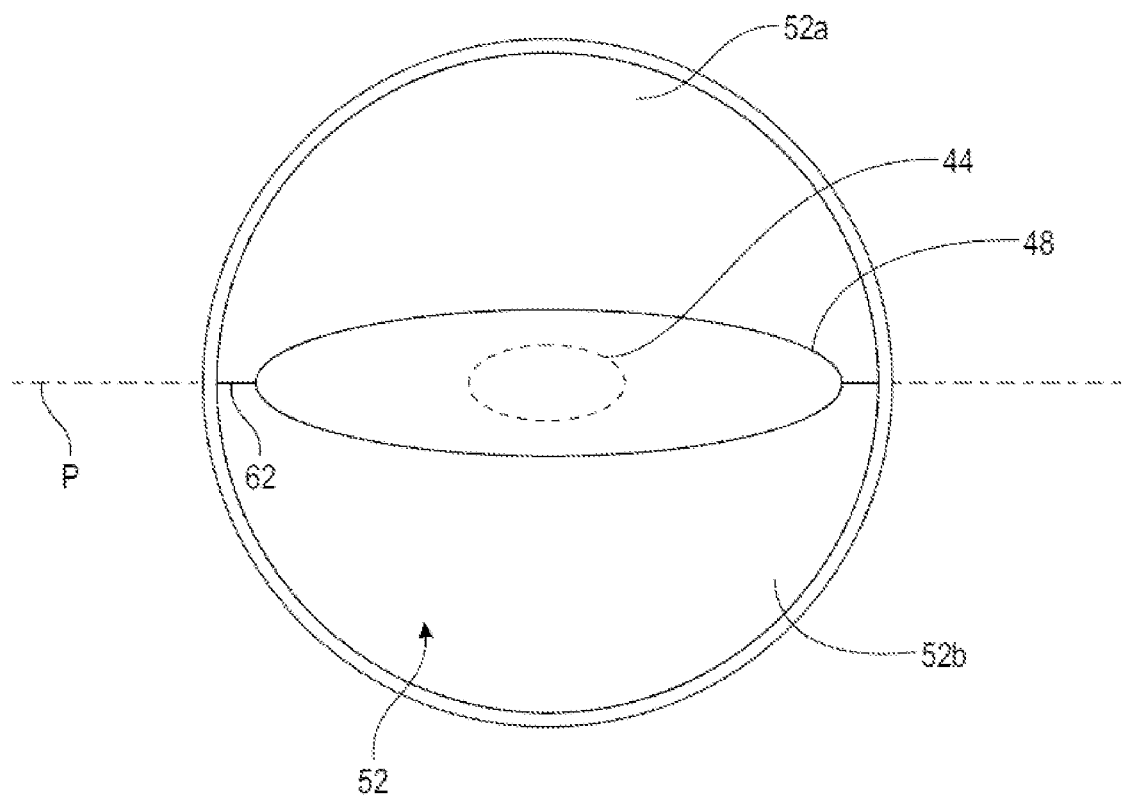

[Fig.10]
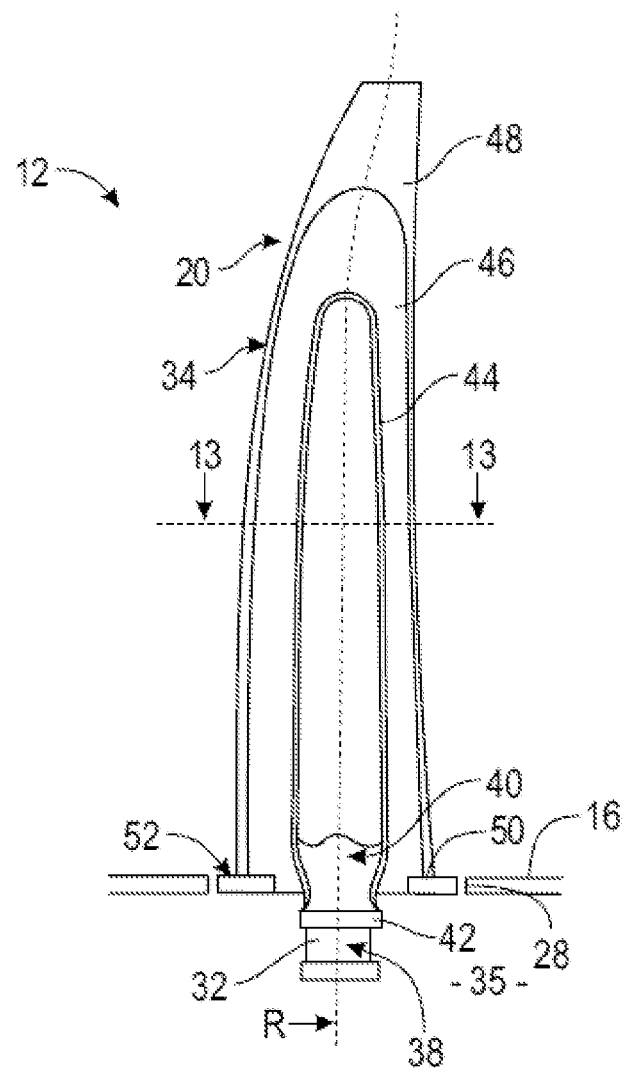

[Fig.11]
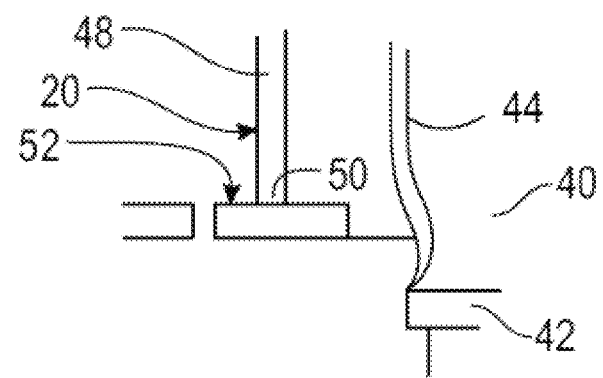

[Fig.12]
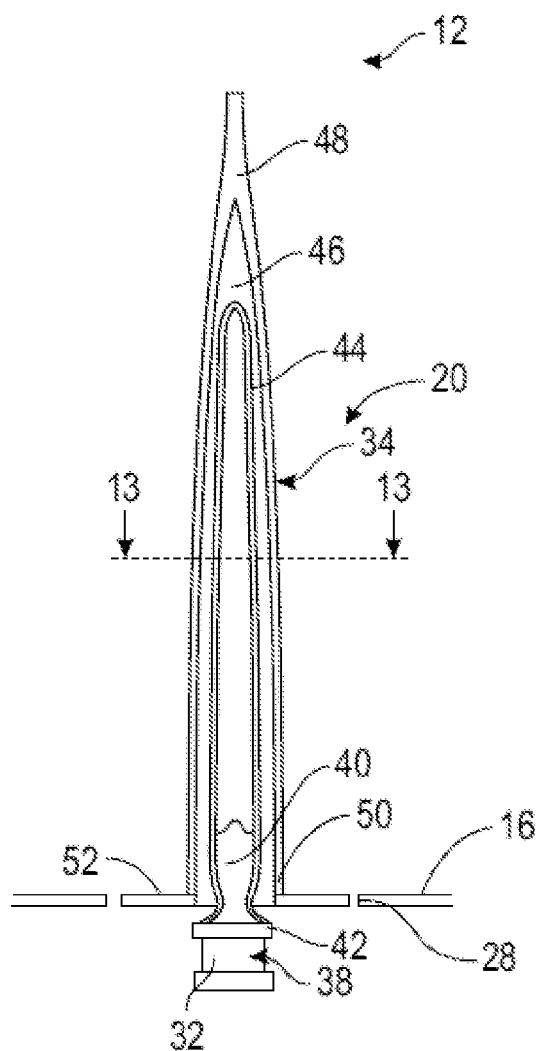

[Fig.13]
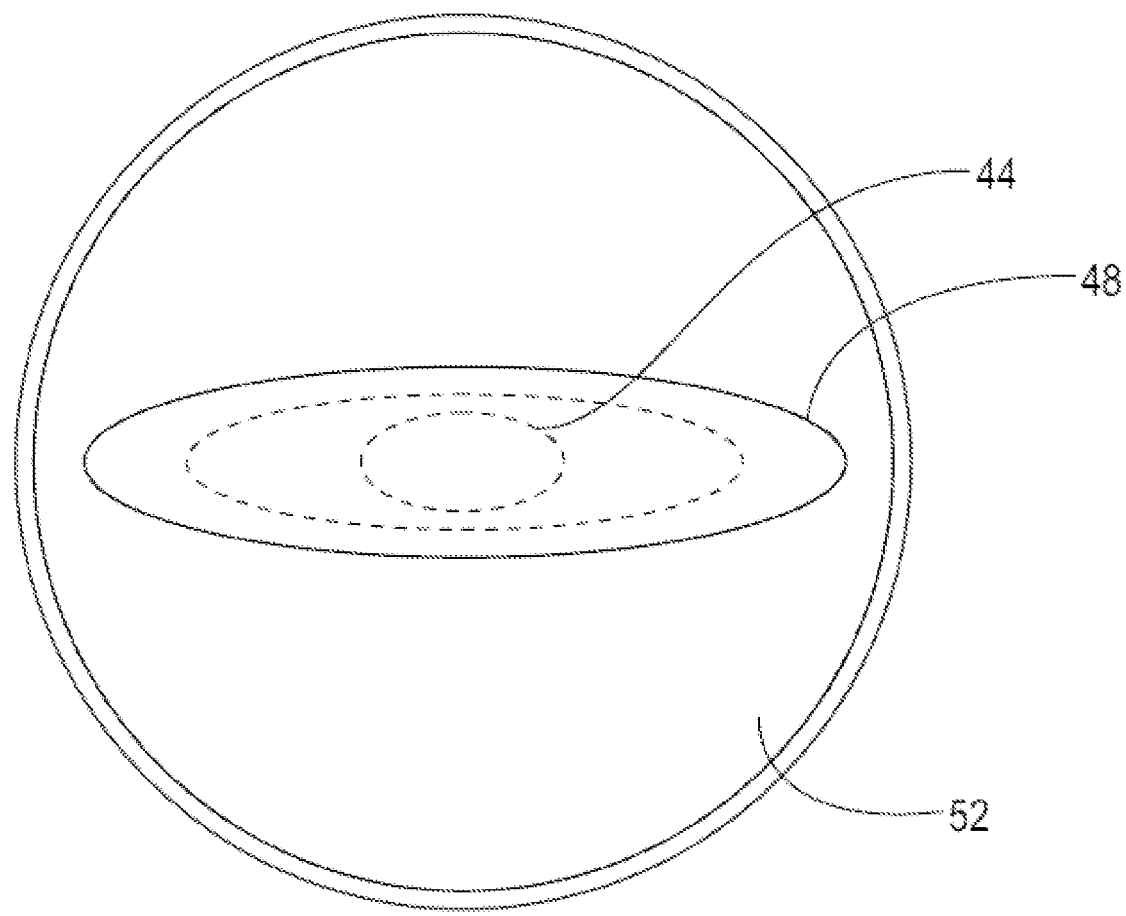

[Fig.14]
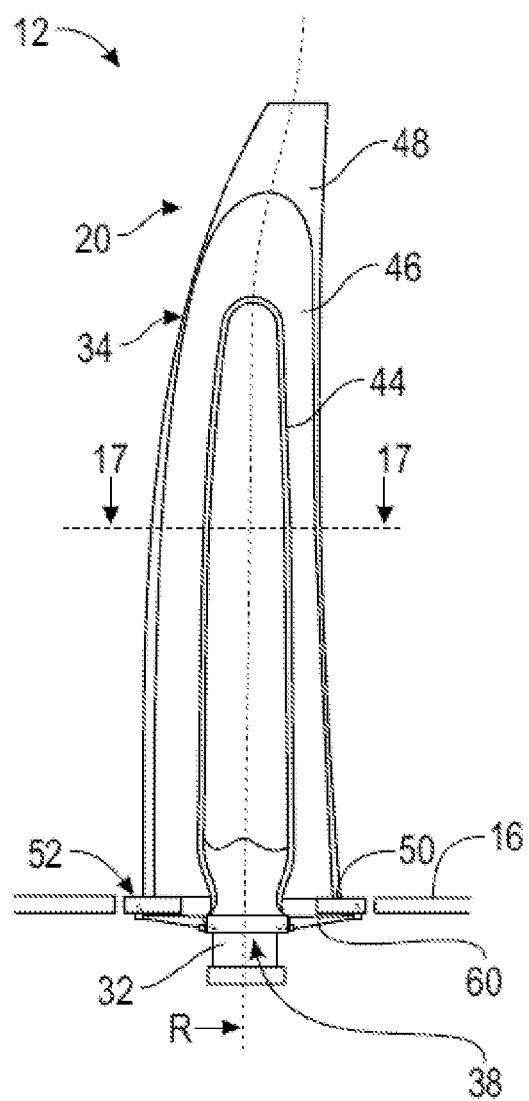

[Fig.15]
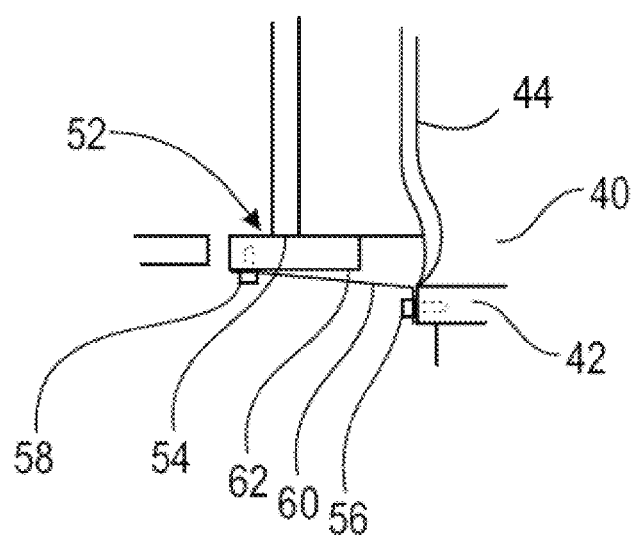

[Fig.16]
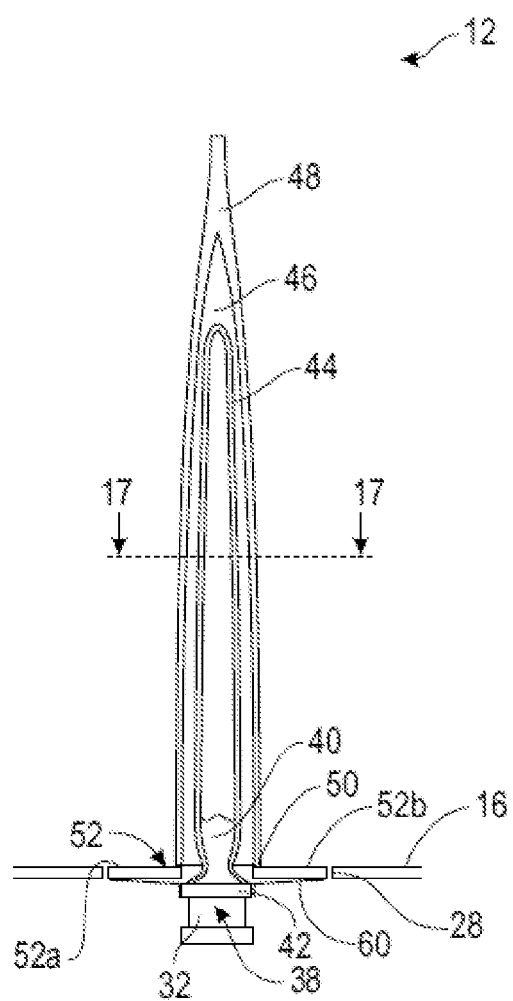

[Fig.17]
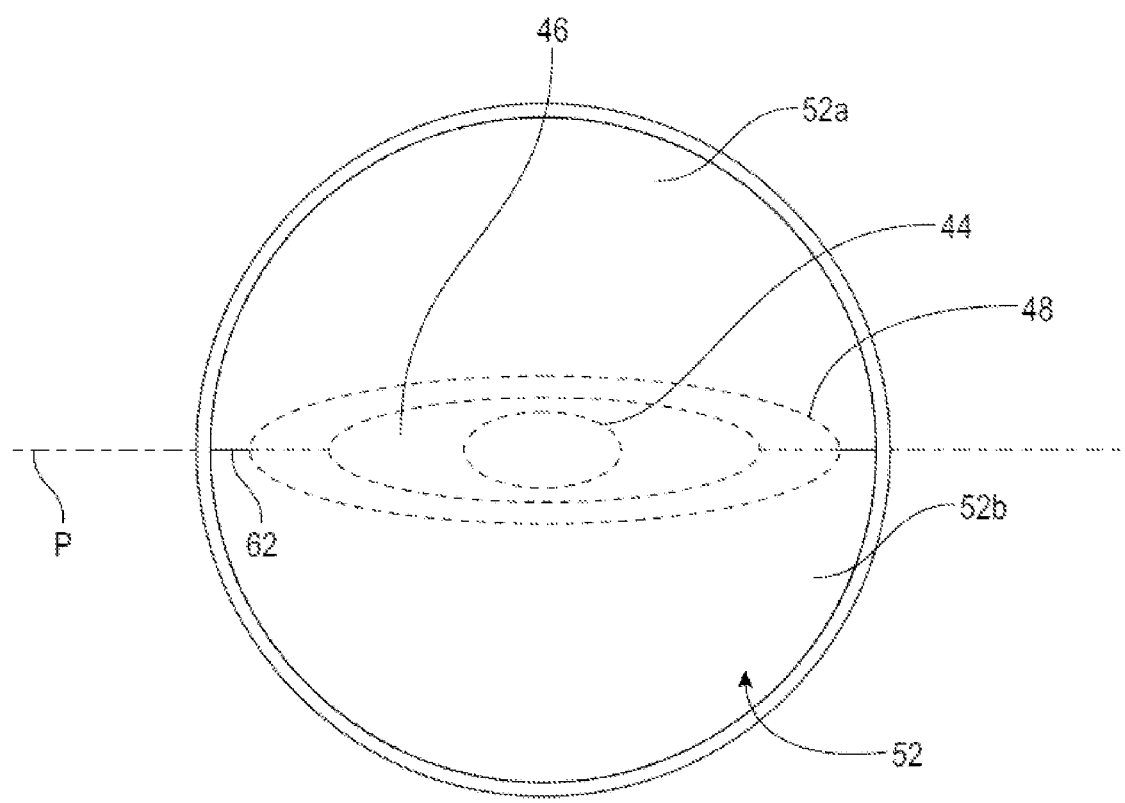

[Fig.18]
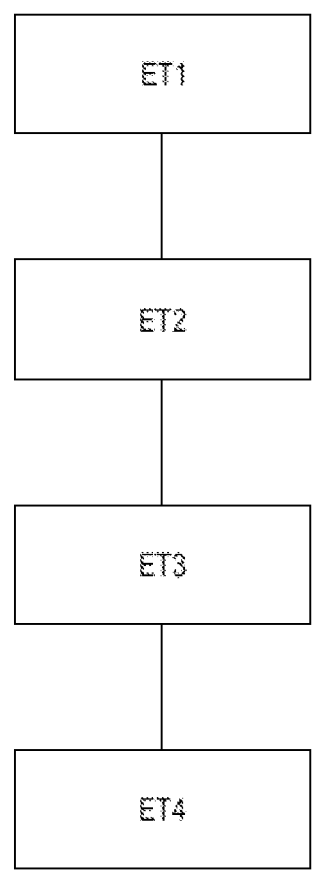

UNDUCTED FAN HAVING VARIABLE PITCH BLADES COMPRISING REDUCED DISTURBANCE PLATFORMS

TECHNICAL FIELD OF THE INVENTION

The field of the present invention is that of unducted fans with variable pitch blades, and in particular those intended for the propulsion of the aircrafts.

TECHNICAL BACKGROUND

The fans with variable pitch blades represent a particular field of the fans, whether they are used for the propulsion of the aircrafts or other aerodynamic applications, such as wind turbine fans.

A fan with variable pitch blades essentially comprises an axially oriented hub equipped with housings receiving vanes which are pivotably mounted movable about radial axes in these housings. Each vane comprises a root from which a blade extends. The root is mounted in a corresponding housing of the hub by means of a bearing oriented along the radial axis, which is interposed between an internal structure of the hub and the root of the vane in order to allow its pivoting, as classically disclosed in the documents U.S. Pat. No. 6,213,719-B1 and FR-2.375.033-A1.

The hub usually comprises an external casing that constitutes an aerodynamic fairing of the hub. In this casing there are openings through which the housings open and through which the roots of the vanes are inserted into the hub.

There are therefore aerodynamic discontinuities at the level of this fairing in the vicinity of the openings, on the one hand between the roots of the vanes and the edges of the openings, and on the other hand between the roots of the vanes and the blades of the vanes. These aerodynamic discontinuities cause turbulence around the base of the blades, which deteriorates the overall aerodynamic efficiency of the fan.

It is therefore important to propose an aerodynamic platform for each blade allowing to ensure a continuity between the platform and the circumference of the associated opening, and between the base of the blade and the platform, in order to limit any turbulence.

In the case of fans for the propulsion of the aircrafts, the environmental and economic constraints are increasingly leading engine manufacturers to increase the bypass ratios of the turbomachines so as to reduce the acoustic signature of the fan and to reduce fuel consumption. As a result, the diameter of the fan continues to increase, with a consequent increase in the size of the vanes of the fan. However, the resulting increase in mass of the vanes indirectly implies an increase in the mass of the hub, which must be able to withstand greater centrifugal forces. To address this issue, there are two conventional technologies that allow to reduce the mass of the rotor blades. The first consists in producing hollow blades and the second consist in the use of organic matrix composite material, also referred to as OMC.

The combined use of these two technologies allows a very significant weight saving of the fan. This is in particular the case for the blades of fan of turbomachine of the open rotor type with unducted fan where the length is not limited by the presence of a fairing surrounding the fan.

In the case of a turbomachine, the sealing control is essential in the aerodynamic duct as it directly influences the performances of the engine. The aim is therefore to eliminate from the one hand the air leakage between the blade and the platform and from the other hand the turbulences between the platform and the circumference of the opening.

For example, in the case of variable pitch fans, two half-platforms can be fitted to the underside of the fan vane and screwed to a pivot, which allows to receive a dovetail-shaped blade root by means of a broach attachment system.

This solution, by providing a platform that extends to the circumference of the opening, allows to limit the air leakage at this level, but there is still a clearance between the two half-platforms and a clearance between the blade, which does not extend radially to the platform, and the assembled platform. These clearances are usually filled in a quasi-artisanal way with elastomeric joints.

Other solutions are known for other types of vanes comprising different blade roots.

The document EP-2.796.367-A1 describes a one-piece vane with the root trapped between two flanges equipped with half-platforms that join around the root.

The document U.S. Pat. No. 4,045,149A describes and depicts a rotor vane equipped with a blade, a platform and a root, the blade of which is pivotally mounted in its root about an axis substantially parallel to that of the hub of the fan, so as to allow a lateral movement of the blade relative thereto in the event of impact with a foreign object. The platform is produced in two portions and comprises two platforms which are movable relative to each other, a first platform being attached to the blade and being able to accompany its movements by sliding under a second platform, the blade being movable in a slot in the second platform which in turn is attached to the root and extends to the edge of the opening of the hub.

This last design therefore leaves significant air leakages between the blade and the platform, necessitated by the articulation of the blade. In addition, the blade does not extend to the first platform, so there is a clearance between a lower edge of the blade and the two platforms, which again can cause aerodynamic disturbances.

In order to eliminate the clearances between the blade and the platform, it was proposed in the document WO2013/104852 that a vane comprising a blade obtained from a fibrous preform, and integrating the platform to the blade by un-binding a portion of the fibrous preform which structures the blade, is proposed. However, this solution is on the one hand complex in terms of mastering the manufacturing method and on the other hand the geometries of the platforms that can be produced are limited by the geometry of the preform that makes up the blade. In particular, the passage from the blade to the platform generates shifting, i.e. a non-orthogonal orientation of the warp and the weft. In addition, the thickness of the platform is limited by the thickness of the composite blade skin.

The document FR-3.048.228-A1 partially solves this problem by proposing a vane in which the base of the blade is trapped in a platform which is shaped like a sphere portion and extends to the edge of the opening of the corresponding housing. The sphere portion shape of the platform allows to adapt to a hub the external casing of which is frustoconical in shape without creating aerodynamic disturbances regardless of the angular position of the vane. However, while in this document there is no clearance, either between the blade and the platform or between the platform and the edge of the opening, the form shaped like a sphere portion of the platform necessarily creates significant aerodynamic disturbances downstream of the vane.

Finally, the document is silent on the method for producing this platform, whether it is the mounting of the platform on the vane or its manufacturing method.

SUMMARY OF THE INVENTION

There is therefore a real need for a vane equipped with a platform allowing to limit the aerodynamic disturbances between the platform and the opening of the housing and especially between the blade and the platform, while being simple and efficient in design.

To this end, the invention proposes an unducted fan with variable pitch blades for an aeronautical or wind turbine thruster, comprising a hub equipped with housings receiving vanes pivoting about radial axes, and an external casing constituting an aerodynamic fairing for the hub, circular openings of said housings opening out into said external casing, each vane comprising:

- a root configured to be mounted in rotation about a radial axis in the associated housing,
- a generally radially oriented blade, and
- a platform substantially in the shape of a disc extending, transversely to the radial direction, from said blade to an edge of the circular opening of the associated casing, the blade comprising at least one skin comprising an aerodynamic external surface defining a pressure side and a suction side of the blade, said skin comprising a free lower edge turned towards said root, characterised in that the platform is fitted to the free lower edge of the skin.

According to other characteristics of the fan:

the platform is fitted around the free lower edge on an external surface of the skin, the platform is fitted under said free lower edge of the skin, the skin is made of woven fibres embedded in a resin and the platform is glued to the free lower edge of the skin and embedded in the resin with the blade, the fan is an aeronautical thruster fan and further comprises a spar connected to the root and extending along the axis inside the blade, a foam form ensuring the interface between the spar and the woven fibre skin, and the platform comprises at least one portion penetrating said foam form.

The fan is an aeronautical thruster fan and comprises:

an attachment of cylindrical geometry, with radial axis, emerging from the lower edge of the blade and capable of maintaining said blade on the associated hub, said attachment comprising a tulip-shaped portion, a base of which projects out of the blade, and the root of the blade, which extends the base, and which is capable of being pivotally received in the associated housing of the hub, a hollow tubular spar, extending along a portion of the blade, one end of which is received on the tulip-shaped portion and is attached thereto by a coiling, and the platform is attached to the base of the tulip-shaped portion, with a first elastomeric sealing joint arranged between the blade and the platform.

the platform is attached to the base of the tulip-shaped portion by means of at least one tab which extends between the base of the tulip-shaped portion and a lower face of the platform.

the at least one tab is attached to the base of the tulip-shaped portion by at least one screw and to the lower face of the platform by at least one screw.

the platform is constituted of two half-platforms joined in a plane passing through the axis of the vane, which are fitted around the free lower edge of the blade and attached to the base of the tulip-shaped portion, a second elastomeric sealing joint being arranged between the two half-platforms.

The invention also relates to a first method for manufacturing a vane for an aeronautical thruster fan of the type described above, characterised in that it comprises at least one first step during which a vane blank is produced comprising a skin made of woven fibres, a second step during which the vane is deposited in an injection mould, a third step during which the platform is moulded with the blade by an RTM resin transfer method, and a fourth step during which the platform is glued to the free lower edge of the skin.

Finally, the invention relates to a second alternative method for manufacturing a vane for an aeronautical thruster fan of the type described above, characterised in that it comprises at least one first step during which a vane blank is produced comprising a skin made of woven fibres, a second step during which the platform is glued to the free lower edge of the skin, a third step during which the vane is deposited in an injection mould, and a fourth step during which the platform is moulded with the blade by an RTM resin transfer method.

BRIEF DESCRIPTION OF THE FIGURES

Further characteristics and advantages of the invention will become apparent from the following detailed description, for the understanding of which reference is made to the attached drawings in which:

FIG. 1 is a perspective view of an open rotor turbomachine with an unducted fan doublet;

FIG. 2 is a detailed cross-sectional view, through a plane containing the axial direction of the turbomachine of FIG. 1, of a fan according to the prior art;

FIG. 3 is a detail view of FIG. 2;

FIG. 4 is a detailed cross-sectional view, through a plane perpendicular to the axial direction of the turbomachine of FIG. 1, of the fan according to the prior art;

FIG. 5 is a cross-sectional view through the plane 5-5 of FIGS. 2 and 4, of the fan according to the prior art;

FIG. 6 is a detailed cross-sectional view, through a plane containing the axial direction of the turbomachine of FIG. 1, of a fan according to a first embodiment of the invention;

FIG. 7 is a detail view of FIG. 6;

FIG. 8 is a detail cross-sectional view, through a plane perpendicular to the axial direction of the turbomachine of FIG. 1, of the fan according to the first embodiment of the invention;

FIG. 9 is a cross-sectional view through the plane 9-9 of FIGS. 6 and 8, of the fan according to the first embodiment of the invention;

FIG. 10 is a detail cross-sectional view, through a plane containing the axial direction of the turbomachine of FIG. 1, of a fan according to a second embodiment of the invention;

FIG. 11 is a detail view of FIG. 10;

FIG. 12 is a detailed cross-sectional view, through a plane perpendicular to the axial direction of the turbomachine of FIG. 1, of the fan according to the second embodiment of the invention;

FIG. 13 is a cross-sectional view through the plane 13-13 of FIGS. 10 and 12, of the fan according to the second embodiment of the invention;

FIG. 14 is a detailed cross-sectional view, through a plane containing the axial direction of the turbomachine of FIG. 1, of a fan according to a third embodiment of the invention;

FIG. 15 is a detail view of FIG. 14;

FIG. 16 is a detailed cross-sectional view, through a plane perpendicular to the axial direction of the turbomachine of FIG. 1, of the fan according to the third embodiment of the invention;

FIG. 17 is a cross-sectional view through the plane 17-17 of FIGS. 14 and 16, of the fan according to the third embodiment of the invention;

FIG. 18 is a block diagram illustrating the manufacturing steps of a turbomachine vane according to the first embodiment of the invention.

DETAILED DESCRIPTION OF THE INVENTION

FIG. 1 shows an aircraft turbomachine 10 of the "open rotor" type comprising two counter-rotating fans 12, 14 of axis A. Each fan 12, 14 comprises an associated hub 16, 18 equipped with housings in which are pivotally mounted respective vanes 20, 22 oriented substantially along radial directions R. Each hub 16, 18 comprises an external casing 24, 26 constituting an aerodynamic fairing in which the housings open out by means of openings 28, 30 in which the vanes 20, 22 are mounted.

FIGS. 2 to 5 show a conventional mounting of a vane 20 in the hub 16 of a fan 12.

Conventionally, a vane 20 comprises a root 32 which is configured to be mounted in rotation about a radial axis R in the housing 35 of the fan 12. From this root 32 extends a blade 34, generally coaxial to the radial direction R.

There are many different types of vanes 20 available, both metallic vanes 20 and vanes made from composite materials.

In a non-limiting manner of the invention, the vane 20 which has been represented in FIGS. 2 to 5 is a vane made of composite materials which comprises an attachment 38 of cylindrical geometry, with a radial axis, emerging from a lower edge 50 of the blade 34, and which is able to maintain the blade 34 on the associated hub. This attachment 38 consists essentially of a tulip-shaped portion 40, a base 42 of which projects out of the blade 34, and the root 32 of the vane, which extends the base 42 and is adapted to be pivotally received in the associated housing 35 of the hub 16.

A spar 44 is connected to the root 32 and extends along the axis R inside the blade 34. More particularly, the spar 44 is attached to the tulip-shaped portion 40 and extends into the blade 34 from the latter. According to a manufacturing method which is well known to the prior art and which will not be described further, the spar 44 is, for example, a hollow tubular spar made of braided carbon fibres, which is slipped onto the tulip-shaped portion 40 and maintained there by a coiling (not shown) of glass fibres. The spar 44 is covered by a foam form 46, which is in turn covered by a woven fibre skin 48, the foam form 46 ensuring the interface between the spar 44 and the woven fibre skin 48. The skin 48 defines an aerodynamic external surface defining a pressure side 48a and a suction side 48b of the blade 34, as shown in FIG. 5. As illustrated in FIGS. 2 to 4, the skin 48 furthermore comprises a free lower edge 50 which is turned towards the root 32.

During the manufacture of the vane 20, the attachment 38 equipped with the tubular spar 44, the foam form 46, and the skin 48 forms a preform which is placed in a resin injection mould and then subjected to an RTM resin transfer method to produce the final blade 34.

This configuration is not limiting to the invention. The invention is more generally applicable to all vanes 20 comprising a blade 34 equipped with a free lower edge 50. This is also the case, for example, with wind turbine blades made of composite materials, which comprise blades equipped with substantially tubular free lower edges from which attaching tie rods are projecting, these tie rods being intended to be received in the hubs of the corresponding wind turbines.

As can be seen in FIG. 3, in this conventional configuration there is a large clearance J1 between the blade 34 and the edge of the opening 28, and a clearance J2 between the lower edge 50 of the blade 34 and the hub 16. These clearances J1 and J2 promote aerodynamic disturbances that affect the efficiency of the fan and degrade performance.

To overcome these disadvantages, a vane equipped with a platform extending perpendicular to the radial direction R between the blade and the edge of the opening 28 was proposed, this platform being shaped like a sphere portion and trapping the lower end of the blade. The spherical shape of the platform allows it to be adapted to all the pivoting positions of the blade. However, this platform is also bulky and induces aerodynamic disturbances, in particular downstream of the vane.

The invention aims to remedy these disadvantages by proposing a platform that is able to extend perpendicular to the radial direction R between the blade and the edge of the opening 28 and does not induce additional aerodynamic disturbances.

For this purpose the invention takes advantage of a particular configuration of a vane 20 comprising a blade 34 equipped with a free edge 50. This edge 50 is used to ensure the attachment of a platform that substantially allows to cancel the previously mentioned clearances J1 and J2.

To this end, the invention proposes a fan 12 of the type described above, characterised in that a platform 52 is fitted to the free lower edge 50 of the skin 48.

According to a first embodiment of the invention which has been shown in FIGS. 6 to 9, the platform 52 may be fitted around the free lower edge 50 on an external surface 49 of the skin 48.

According to second and third embodiments of the invention which have been shown in FIGS. 10 to 13 and FIGS. 14 to 17 respectively, the platform 52 may be fitted under the free lower edge 50 of the skin 48.

Several configurations are possible, generally speaking, depending on the material of the blade 34. It is thus possible to envisage different types of connection between the platform 52 and the vane 20, depending on the material of the blade 34.

For example, in the case of a metal blade 34, the platform 52 would preferably be metal and would be fitted to the free lower edge 50 of the skin 48 by welding.

The way the platform 52 is attached to the skin 48 also depends on the surface of the skin 48 to which it is fitted and the material of this skin 48.

When the skin 48 is made of woven fibres embedded in a resin, i.e. when the vane 20 is obtained by an RTM resin transfer moulding method, the platform 52 may, according to a first manufacturing method, simply be glued to the free lower edge 50 of the skin 48 after polymerisation of the resin with which the blade 34 is impregnated.

Alternatively, still when the skin 48 is made of woven fibres embedded in a resin and the vane 20 is obtained by an RTM resin transfer moulding method, the platform 52 may, according to a second manufacturing method, be glued to the free lower edge 50 of the skin 48 prior to the polymerisation of the skin 48, i.e. when the skin 48 is still only at the preform stage on the semi-finished vane 20. The platform 52 can then be embedded in the resin with the blade 34 during the manufacture of the vane 20, and thus be over-moulded with it.

The blade 34 may comprise a spar 44 extending along the axis R within the blade 34, this spar 44 being covered by a foam form 46 ensuring the interface between the spar 44 and the woven fibre skin 48. In the configuration associated with the second manufacturing method, the platform 52 could then comprise at least one portion (not shown) penetrating the foam form 46.

This configuration is particularly advantageous because the resin, introduced into the blade and the foam by the RTM moulding method, allows, after its polymerisation, to firmly trap this portion in the foam, thus allowing to increase the reliability of the attachment of the platform 52.

These first and second manufacturing methods are thus more particularly associated with the second embodiment of the invention which has been depicted in FIGS. 10 to 13.

According to the first manufacturing method, as still illustrated in FIG. 18, the vane 34 may be manufactured in a first step ET1 in which a vane blank 20 comprising a skin 48 of woven fibres is made according to the method previously described with reference to the prior art.

Then, in a second step ET2, the vane 20 is deposited in an injection mould (not shown), and in a third step ET3, the platform 52 is moulded with the blade 34 by an RTM resin transfer method well known to the prior art. Finally, in a fourth step ET4, a rigid platform 52 is provided. This platform can be metallic or made of a composite material that has already been stiffened by a prior injection of resin. In this fourth step ET4, the platform 52 is glued to the free lower edge 50 of the skin 48.

According to the second manufacturing method, as still illustrated in FIG. 18, the vane 34 may be manufactured in a first step ET1 in which a vane blank 34 comprising a skin 48 of woven fibres is made according to the method previously described with reference to the prior art.

Then in a second step ET2, a rigid platform 52 is provided. This platform can be metallic or made of a composite material that has already been stiffened by a prior injection of resin. In this second step ET2, the platform 52 is glued to the free lower edge 50 of the skin 48, which is still in the preform stage. Then, in a third step ET3, the vane 20 is deposited in an injection mould (not shown), then, in a fourth step ET4, the platform 52 is moulded with the blade 34 by the RTM resin transfer method, which is well known to the prior art.

According to the first and third embodiments of the invention which have been shown in FIGS. 6 to 9 and 14 to 17 respectively, the platform 52 is attached to the base 42 of the tulip-shaped portion 40.

This design may or may not be associated with a gluing of the platform 52 to the lower edge of the blade 34. However, it also allows the platform 52 to be attached to the vane 20 without gluing in a third manufacturing method. In this case, a first elastomeric sealing joint, the location of which is shown by the reference 54, is arranged between the blade 34 and the platform 52.

More particularly, as illustrated in FIGS. 7 and 15, the platform 52 is attached to the base 42 of the tulip-shaped portion 40 by means of at least one tab 60 which extends between the base 42 of the tulip-shaped portion 40 and a lower face 62 of the platform 52. The tab 60 is preferably attached to the base 42 of the tulip-shaped portion 40 by at least one screw 56 and to the lower face 62 of the platform 52 by at least one screw 58.

The tab 60 can take various forms. It may be substantially straight and the platform 52 may be connected to the base 42 by a plurality of tabs 60 angularly distributed evenly around the base 42 of the tulip-shaped portion 40. Alternatively, the tab 60 may have a cup or frustoconical cup sector shape extending along a specified angular sector about the axis R of the vane 20, this angle may be up to 360 degrees. In this case, the tab 60 is attached to the base 42 of the tulip-shaped portion 40 by a plurality of screws 56 and to the lower face 62 of the platform 52 by a plurality of screws 58.

Preferably, in the first and third embodiments of the invention, i.e. when the platform 52 is attached to the base 42 of the tulip-shaped portion 40, the latter is constituted by two half-platforms 52a and 52b, which have been shown in FIGS. 9 and 17 as joined along a plane P passing through the axis R of the vane 20, and which are fitted around the free lower edge 50 of the blade 34. The two half-platforms 52a and 52b are each attached to the base 42 of the tulip-shaped portion 40 and a second elastomeric sealing joint, the position of which is shown by the reference 62, is then arranged between the two half-platforms 52a, 52b to ensure the sealing.

The invention therefore allows to proposes a fan 12 with minimised aerodynamic leakage between the vane 20 and the openings 28 of the hub 16, and with minimised aerodynamic disturbance between the blades 34 and the platforms 52. The efficiency of such a fan 12 is therefore considerably increased.

The invention claimed is:

1. An unducted fan with variable pitch blades for an aeronautical or wind turbine thruster, comprising a hub equipped with housings receiving vanes pivoting about radial axes, and an external casing constituting an aerodynamic fairing for the hub, said housings opening into said external casing through circular openings, each vane comprising:
   a root configured to be mounted in rotation about a radial axis in the associated housing;
   a generally radially oriented blade; and
   a platform substantially in the shape of a disc extending, transversely with respect to the radial direction, from said blade to an edge of the circular opening of the associated casing, the blade comprising at least one skin comprising an aerodynamic external surface defining a pressure side and a suction side of the blade, said skin comprising a free lower edge turned towards said root,
   wherein the platform is fitted to the free lower edge of the skin.

2. The fan according to claim 1, wherein the platform is fitted around the free lower edge on an external surface of the skin.

3. The fan according to claim 1, wherein the platform is fitted under said free lower edge of the skin.

4. The fan according to claim 1, wherein the skin is made of woven fibers embedded in a resin and wherein the platform is glued to the free lower edge of the skin.

5. The fan according to claim 4, wherein the platform is embedded in the resin with the blade.

6. The fan according to claim 4, wherein the fan is for an aeronautical thruster and further comprises:
   a spar connected to the root and extending along the axis inside the blade, and
   a foam form ensuring the interface between the spar and the woven fiber skin,
   and wherein the platform comprises at least one portion penetrating said foam form.

7. The fan according to claim 1, wherein the fan is for an aeronautical thruster and comprises:
- an attachment of cylindrical geometry, of radial axis, emerging from the lower edge of the blade and capable of maintaining said blade on the associated hub, said attachment comprising a tulip-shaped portion, a base of which projects out of the blade, and the root of the blade, which extends the base, and which is capable of being received in a pivoting manner in the associated housing of the hub,
- a hollow tubular spar, extending along a portion of the blade, one end of which is received on the first tulip-shaped portion and is attached thereto by a coiling,
- and wherein the platform is attached to the base of the tulip-shaped portion, a first elastomeric sealing joint being arranged between the blade and the platform.

8. The fan according to claim 7, wherein the platform is attached to the base of the tulip-shaped portion by at least one tab which extends between the base of the tulip-shaped portion and a lower face of the platform.

9. The fan according to claim 8, wherein the at least one tab is attached to the tulip-shaped portion by at least one screw and to the lower face of the platform by at least one screw.

10. The fan according to claim 7, wherein the platform is constituted of two half-platforms joined in a plane passing through the axis of the vane, which are fitted around the free lower edge of the blade and are attached to the base of the tulip-shaped portion, a second elastomeric sealing joint being arranged between the two half-platforms.

11. A method for manufacturing a vane for an aeronautical thruster fan according to claim 4, wherein the method comprises at least one first step during which a vane blank comprising a skin made of woven fibers is produced, a second step during which the vane is deposited in an injection mold, a third step during which the platform is molded with the blade by an RTM resin transfer method, and a fourth step during which the platform is glued to the free lower edge of the skin.

12. The method for manufacturing a vane for an aeronautical thruster fan according to claim 5, wherein the method comprises at least one first step during which a vane blank is produced comprising a skin made of woven fibers, a second step during which the platform is glued to the free lower edge of the skin, a third step during which the vane is deposited in an injection mold, and a fourth step during which the platform is molded with the blade by an RTM resin transfer method.

* * * * *